Patented Aug. 15, 1933

1,922,463

UNITED STATES PATENT OFFICE 1,922,463

PROCESS OF DYEING AND THE DYED MATERIALS PRODUCED

Joseph Felix Turski, Warsaw, Poland

No Drawing. Application July 15, 1931, Serial No. 551,041, and in Poland February 14, 1929

27 Claims. (Cl. 8—5)

This invention relates to processes of dyeing and the dyed materials produced; and it comprises a method wherein a material is impregnated with certain intermediates, the impregnated material is treated with a diazotizing means to form a diazo compound in situ and the dyestuff is developed in situ, the intermediate sometimes being simultaneously diazotized and self-coupled to form the dyestuff; and it further comprises materials dyed with the dyestuff so produced; all as more fully hereinafter set forth and as claimed.

In certain prior processes, dyestuffs have been developed in a situ in a material to be dyed, but in such processes, the fabric was impregnated or padded with compounds serving as end components only and the impregnated fabric was treated with a solution of a diazo compound, the diazo compound coupling with the end components to form the dyestuff. In such processes, the diazo compounds, the end components or both were different from the intermediate compounds which are used in my present processes.

I have found that by using certain intermediates containing an amino group capable of being diazotized I can impregnate the material to be dyed with said intermediates and diazotize them so that the diazo compound is formed in situ in the material. A dyestuff may then be developed by coupling a suitable end component with the diazo compound which has been formed in situ.

The new intermediates which may be used in my processes are of the type disclosed and claimed in my prior and copending application, Ser. No. 427,068, filed February 8, 1930, of which the present application is a continuation in part. These intermediates contain an amino group. They are capable of being diazotized and used as first components in making azo dyestuffs. Also they are capable of being coupled with diazo compounds and may be used as end components. Because of these inherent properties, they may be converted directly into azo dyestuffs without the use of other components; they may be simultaneously diazotized and self-coupled to produce azo dyestuffs in a single step.

In my application Ser. No. 427,068, I have disclosed a class of intermediates having the generic formula:

wherein $R_1$ represents an aryl residue or the residue of the enol component of a ketocarboxylic acid and $R_2$ represents an aryl residue. Intermediates of this generic class may be used in my present processes. This generic class of intermediates may be subdivided into subgeneric classes of which the following are typical:

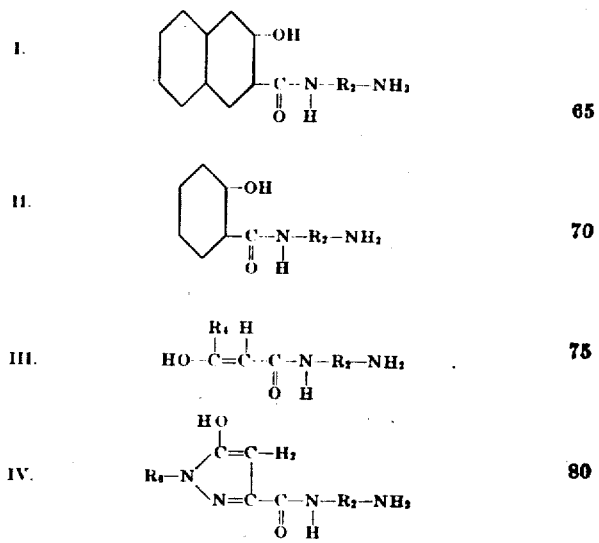

wherein $R_4$ represents hydrogen or an alkyl group, $R_5$ represents an aryl or alkyl group and $R_2$ represents an aryl group. The intermediates in which the $R_2$ represents a residue of the type

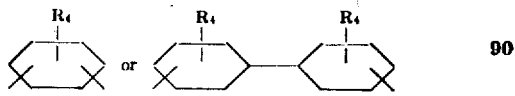

may be advantageously used in my processes.

All of these types of intermediates contain an amino group capable of being diazotized to give the diazo compounds necessary in my process. Also these intermediates are capable of coupling with diazo compounds to form dyestuffs, acting as end components. When a fabric impregnated with these intermediates is treated in a diazotizing bath under the proper conditions there is both a diazotizing and coupling of the intermediates to form the dyestuffs in situ.

However other suitable types of compounds may be used for coupling as end components, these end components being applied and coupled after the intermediate has been diazotized in situ to form the diazo compound. Any of the usual compounds used as end components in making azo dyestuffs may be coupled in my process with these new intermediate compounds after they have been diazotized in situ. Certain compounds disclosed in my prior application Ser. No. 427,068 may be likewise used as end components. For instance compounds of the types having the following probable structural formula may be used:

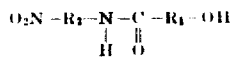

and

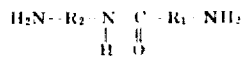

wherein $R_1$ and $R_2$ represent aryl residues.

Also the intermediates may be used in my process as end components only, the dyestuff in such cases being developed by coupling with a diazo compound. But in this procedure, the shades obtained are not as satisfactory as in the processes set forth ante. However, if the coupling is made with care and the diazo compounds properly selected, satisfactory shades may be produced by using this modification of my generic process. For instance using tetrazotized dianisidin and coupling the tetra-azo compound under the proper conditions with my new intermediates as end components, satisfactory shades may be obtained, the shade being in most cases a permanent bluish black. The diamino intermediates disclosed in my prior application Ser. No. 427,068 which may be represented by the probable structural formula:

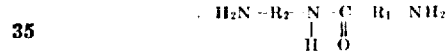

wherein $R_1$ and $R_2$ represent aryl residues may be tetra-azotized and coupled with the new intermediates of the type disclosed which contain a hydroxyl group, to produce the dyestuff.

In my processes, the material to be dyed is first impregnated with the new intermediate. The fabric may be impregnated by means of an aqueous solution of the intermediate. Most of these intermediates are substantially insoluble in water alone but they dissolve in aqueous solutions containing a little caustic soda. In some instances the intermediates in the form of the hydrochlorid, that is in the form of salts combined with hydrochloric acid or other acids, are soluble in water and solutions may be prepared. The fabric may be impregnated either by means of an aqueous alkaline solution or by solutions of the saline or hydrochlorid type combinations of the intermediate.

These impregnating baths may be prepared in any suitable manner. An alkaline impregnating bath may be prepared by dissolving the intermediate in an aqueous soda solution, diluting the solution thus obtained with hot water and boiling to clarify the solution which may be filtered if necessary. A clear solution is then diluted with cold water to give the proper volume and concentration for use in impregnating the material to be dyed with the proper amount of intermediate. For instance, an aqueous solution may be prepared by mixing together say 25 cc of 40° B. caustic soda solution and sufficient water to make about 200 cc. About 20 grams of the intermediate may be dissolved in this mixture which may be first warmed, advantageously to temperatures between 80° and 90° C. The particular amount of intermediate to be dissolved in the mixture and the exact amount of caustic soda solution used are adjusted to the particular conditions and the results desired. After the intermediate is added the mixture is heated to obtain a clear solution, the mixture being then diluted with warm water. Conditions are so adjusted as to obtain a clear solution and facilitate filtering to remove insoluble impurities if they be present. The clear solution may be diluted with cold water to give the proper concentration. The clear solution may or may not be cooled before final dilution.

In some instances, it is advantageous that the bath contain other added ingredients. For example, it is sometimes advantageous to add Turkey red oil. The intermediate may first be mixed with a proper amount of Turkey red oil, the mixture stirred into a hot aqueous solution of caustic soda, at, say, about 80 to 90° C.; the caustic solution containing, say, approximately 30 cc of 30° B. caustic soda to 200 cc hot water. The bath obtained is stirred until the ingredients are thoroughly mixed and is then diluted with 500 cc of cold water and reheated to obtain a clear solution. The solution is then cooled and may be further diluted to about 1 liter with cold water. The ratio of Turkey red oil to the intermediate may be roughly about 1:3. This ratio may be varied with the particular intermediate and the particular dyeing process in which the impregnating bath is to be used and the character of the fabric; the specific steps of dyeing being of course given due consideration.

The impregnating bath may also contain sodium nitrite. Impregnating baths containing both the intermediate and sodium nitrite are used in an advantageous modification of my dyeing process. When fabrics are impregnated therewith the fabric contains both the intermediate and the sodium nitrite and a dyestuff is developed by treating with acid solutions. The acid solution reacts with the sodium nitrite to diazotize the intermediate. By adjusting the ratio of the sodium nitrite to the intermediate, the proportion of the intermediate which is diazotized and the proportion of the intermediate which remains undiazotized and functions as an end component may be thus readily adjusted to control the dyeing of the fabric. When the acid solution contains acetic acid, sodium acetate is formed from the sodium nitrite and this is advantageous. In this way the impregnated fabric contains two of the essential dye developing ingredients and the developing solution may contain only the necessary acid. This modification may be advantageously used when the dyestuff is to be formed by acid coupling.

Also other soluble salts may be added to the impregnating baths to assist in the dyeing and these sometimes function to assist in fixing the intermediate or the dyestuff on the fiber. For instance, a small amount of ammonium chlorid may be added to the impregnating bath.

Also, the impregnating baths may contain small amounts of organic liquids, for instance, methyl alcohol may be added. About 50 cc of methyl alcohol may be added to 1 liter of the impregnating baths formed as described above.

When the impregnating bath is formed by dissolving a salt of the intermediate combined with an acid, such salt is usually dissolved in warm water. For instance, the hydrochlorid salt of the intermediate may be dissolved in warm water. The solution may be filtered if necessary to remove insoluble impurities and diluted to give the proper concentration. In certain dyeing processes it is advantageous to use this type of impregnating bath. By applying the intermediate in the form of its saline combinations, in some cases and with certain fibers the intermediate is advantageously fixed on the fiber. It may be that the intermediate in the form of a salt with acid has the hydroxyl group in such a condition that it assists in fixing the intermediate on the fiber. Fabrics containing the hydrochlorid salt of the intermediate may have the dyestuff developed in situ, by treating the impregnated fabric with suitable developing baths. If these developing baths contain salts of acids weaker than hydrochloric acid, they may react with the hydrochlorid, so that sodium chloride and an acid derived from said salt are formed and assist in the dyeing process. A salting out action may occur. Also in this modification, after the fabric has been impregnated with the hydrochlorid salt it may be carefully treated to decompose said hydrochlorid salt and to precipitate the free intermediate in situ in the fiber and thus assist in fixing it thereon. Also in this modification the developing bath may be in substantially a neutral or very slightly acid condition and contain only nitrous acid.

From the above, it will be clear to those skilled in the art that various combinations and modifications may be used in my process to advantage in specific cases to obtain the most advantageous results. However, all of these modifications are within the generic scope of my invention.

Fabrics and other materials which are to be dyed, may be impregnated in various ways with these impregnating baths. Fabrics, yarns or loose fibers may be used. All types of textile materials may be advantageously treated in my processes. Natural and artificial fibers may be used. Animal fibers, such as silk and wool, may be dyed by the processes herein disclosed. Suitable adjustments may be made in specific details for the natural characteristics of these animal fibers. Likewise vegetable fiber such as cotton, etc., may also be used making similar adjustments. Artificial fibers such as cellulose esters and ethers, for instance nitro and acetyl-cellulose and the regenerated cellulose materials, for instance rayon, likewise may be advantageously dyed in my processes. Each of these types of materials has certain characteristic properties in dyeing and the various modifications of my processes may be selected and used in view of these individual characteristics. Any of these materials may be impregnated with the intermediate, with or without other ingredients, by treating them with the described impregnating bath. The material to be dyed may be immersed in the impregnating bath until sufficient of the intermediate is absorbed and then the excess removed in a suitable manner. The wet material may be wrung or squeezed to remove excess. It may be dried, if desired, by evaporating the water and other volatile liquids present. After the intermediate is fixed on the fiber, the impregnated material may be carefully washed with suitable liquids.

The fabric may be immersed or dipped in a bath of a solution of the intermediate in dilute caustic soda solution until the fabric has absorbed the desired amount. It is not necessary to dry the impregnating fabric which may be directly treated with a suitable developing bath.

Woolen goods may be immersed and soaked for approximately one-half hour in an impregnating bath of a dilute aqueous caustic soda solution containing Turkey red oil and the intermediate. The fabric may be wrung out lightly from time to time. The treatment is continued until the fabric absorbs the desired amount of material. The bath may advantageously also contain small amounts of ammonium chlorid and of methyl alcohol. In this procedure the intermediate is advantageously fixed on the fabric. A fabric may be immersed for about 5 seconds in a bath of dilute aqueous solution of caustic soda containing the intermediate, Turkey red oil and sodium nitrite. The wet fabric is wrung to about double its dry weight and then quickly and exactly dried. The impregnating fabric thus produced contains in addition to the intermediate other ingredients, particularly sodium nitrite.

A fabric may be immersed in an impregnating bath of the hydrochlorid salt of the intermediate dissolved in warm water, the fabric being kept in contact until it has absorbed the desired amount of the intermediate. If the intermediate is to be used in its free (insoluble) state, its retention by the fiber may be increased by carefully decomposing the hydrochlorid salt in situ. It is advantageous to form the dyestuff by treating the impregnated fiber with certain developing baths.

In some cases the material obtained from the impregnating step is in a dry condition, while in other cases it is in a moist or wet condition. The exact composition of the developing bath and the manner in which it applies depend upon the results desired and upon the prior treatment in the impregnating step.

Diazotizing baths may be produced in various ways. One such diazotizing bath which may be generally used can be prepared by dissolving a suitable amount of sodium nitrite in about a liter of water at 0° C., adding sufficient hydrochloric acid and sodium acetate to give a solution with a neutral reaction to Congo red indicator. This diazotizing bath acts in effect like a solution of pure nitrous acid. The bath may also advantageously contain a certain amount of formaldehyde.

Another type of diazotizing bath may be made by dissolving a suitable amount of glacial acetic acid and sodium nitrite in water. To this type of bath there may be also added a certain amount of commercial formalin or of methyl alcohol. A third type of diazotizing bath which may be advantageously used with materials impregnated with both the intermediate compound and sodium nitrite, may be made by mixing together suitable amounts of hydrochloric acid, alcohol and formalin solution and diluting with water if necessary. With certain of my intermediate compounds, it is advantageous to treat the material, after it is removed from the diazotizing bath, with solutions of soda and ammonia. This subsequent treatment assists in developing and fixing the dye in the material so that the shades developed are somewhat better. Such a subsequent treatment prevents certain undesirable effects which have been noted in some cases when the dyed materials have been treated with soap solutions.

After the material has been removed from the diazotizing bath and the dyestuff developed and fixed in situ, the dyed material may be further processed to give the final product. It may be rinsed with water, worked in dilute soda or soap solutions, again rinsed with pure water and dried. When treated with soap solutions, that is soaped, the dyed material may be revivified with acidulated wash water before the final rinsing and dyeing. Clear water acidified with about 2 per cent acetic acid may be advantageously used.

One of the advantages of certain modifications of my generic process is that the material to be dyed is impregnated with a single dyestuff intermediate and the impregnated material treated with a simple diazotizing bath, whereby the dyestuff is simultaneously developed and coupled in situ to produce the dyed material.

The following examples illustrate certain typical applications of my generic process. These examples do not limit the generic scope of my invention. The parts are given by weight; "mol" being a gram-molecule.

The examples illustrate various methods of preparing my new intermediate compound.

*Example 1.*—1 mol of meta-nitro-anilide of 2:3-hydroxy-naphthoic acid is suspended in 1 liter of water and heated to 60–65° C. Afterwards there is added with agitation 390 grams of a 61 per cent solution of sodium sulphide. The aminoanilide passes into solution and after termination of the reduction, the solution is filtered from impurities. From the filtrate the amino-anilide is precipitated by means of acid. Mineral or acetic acid may be used; such acid being added until the solution is neutral to litmus. The amino-anilide is recovered, washed and dried. In place of the meta-nitro-anilide of 2:3-hydroxynaphthoic acid used in the above example, there may be substituted the meta-nitro-toluidide of the same acid.

*Example 2.*—1 mol of meta-phenylene-diamine is carefully mixed with one mol of 2:3-hydroxynaphthoic acid and the mixture suspended in 600 grams of toluene. The suspension in toluene is heated to 50° C. and 12 grams of PCl₃ slowly added. The temperature is raised to the boiling point of toluene and the excess of hydrochloric acid boiled off. After the separation of this excess, the mixture is neutralized with sodium carbonate solution and the toluene distilled off. The solid residue is mixed with hot water and boiled to extract soluble impurities. The solution is filtered from the dyestuff and this then dried and ground.

In place of the meta-phenylenediamine in the above example there may be substituted meta-toluylene diamine.

*Example 3.*—1 mol of salicylic acid is condensed with 1 mol of meta-nitroaniline in a manner similar to that of Example 1. The meta-nitroanilide thus obtained is reduced by the process set forth in Example 1.

*Example 4.*—1 mol of benzidine is mixed with 1 mol of salicylic acid and condensation is effected in a manner similar to that set forth in Example 2. The condensation product is dissolved in 800 cc of 10 per cent caustic soda solution and boiled. It is advantageous to dilute the caustic soda solution with about 1 liter of water before boiling the solution. The excess of benzidine is separated by filtration. The benzidine mono salicylid is precipitated by means of acid; the acid being in sufficient amount to produce substantial neutrality.

*Example 5.*—1 mol of 1-phenyl-5-pyrazolone-3-carboxylic acid is condensed with 1 mol of meta-nitro-aniline in the same manner as set forth in Example 2. The nitro-aniline thus produced is then reduced to the corresponding amino compound by the method of Example 1.

*Example 6.*—1 mol of meta-nitro-benzoic acid with 1 mol of meta-nitro aniline and condensation effected by the method of Example 2. The dinitroanilide thus produced is reduced by the process of Example 1 using a double quantity of the reducing agent. The dinitro-anilide is suspended in 2 liters of water at 60–70° C. and either 70 grams of 61 per cent sodium sulphide solution or an alkaline solution of stannous oxid in equivalent quantity is added. After reduction, the reaction product is acidified with sufficient sulfuric acid to give a strong acid reaction. The intermediate is recovered by filtration and dried. Before being used in the dyeing process the dried product is extracted with dilute caustic soda solution, and then dissolved in hydrochloric acid solution, the acid content of which is sufficient to give a slightly acid reaction.

*Example 7.*—1 mol of meta-phenylene- or meta-toluylene-diamine is intimately mixed with 1 mol of beta-hydroxynaphthoic acid and the mixture suspended in 600 grams of toluene. This suspension in toluene is slowly added to a mixture comprising 60 grams of phosphorus trichloride and 60 grams of toluene maintained at 50 or 60° C. The reaction mixture thus obtained is brought to a temperature corresponding to the boiling point of toluene and maintained at this temperature until the excess of hydrochloric acid is driven off. The remaining liquid is neutralized with aqueous soda solution and the toluene removed by steam distillation. The residue after distillation is poured into 2½ liters of hot water and boiled and the solution thus obtained filtered to separate the intermediate from the soluble impurities. Then it is dried and ground.

*Example 8.*—1 mol of dianisidine as the free base is dissolved in 600 cc. of chlorobenzol. 1 mol of freshly made beta-hydroxynaphthoic acid chlorid is dissolved in toluene and slowly added with constant stirring to the chlorbenzol solution of dianisidine. After the reaction is complete the condensation is recovered and purified in a manner similar to that set forth in Example 4.

The following examples are typical processes of the impregnating and dyeing of fabrics by means of my new intermediates.

*Example 9.*—An impregnating bath is prepared by dissolving 20 grams of meta-aminoanilide of 2:3 hydroxynaphthoic acid in 200 cc of water containing 25 cc of 40° B. caustic soda solution and then heating the solution until it becomes clear. This clear solution is diluted with cold water to 1 liter. A fabric of cotton, wool or artificial fiber is saturated with this impregnating solution. The impregnated fabric is treated with a diluted aqueous solution of acetic acid to neutralize or slightly acidify the same. It is then introduced into a diazotizing solution. This diazotizing solution may be prepared by dissolving 7 grams of sodium nitrite in a liter of water acidified with 20 cc of 80 per cent acetic acid. By submerging the impregnated fabric for a few minutes in the above developing bath the dyestuff is developed in situ and the fabric is dyed a splendid red shade. The dyed fabric may be washed and dried in any suitable manner.

*Example 10.*—An impregnating bath is prepared by dissolving 20 grams of the hydrochlorid of meta-amino anilide of meta-aminobenzoic acid produced as in Example 6, in 1 liter of warm water. Fabric is saturated with this impregnating solution. The saturated fabric is then treated with a diazotizing solution containing 7 grams of sodium nitrite in a liter of water acidified by means of 20 cc in water of acetic acid, the solution being rendered neutral to Congo red by the addition of sodium acetate. In a few minutes the dyestuff is developed in situ and the fabric is dyed a brownish yellow shade.

*Example 11.*—An impregnating bath may be prepared as follows: 20 grams of meta-aminoanilide of 2:3 hydroxynaphthoic acid are mixed with 7.5 grams of Turkey red oil to obtain an intimate mixture. The mixture is added to about 200 cc of hot water (80 to 90° C.) and 30 cc of caustic soda solution of 40° B. The solution thus obtained is then mixed with 500 cc of cold water containing dissolved therein 30 grams of solid 97 per cent nitrite and heated to obtain a clear solution. After cooling the clear solution is diluted with cold water to about 1 liter.

Fabric is submerged in this impregnating bath for about 5 seconds, removed and wrung to about double its dry weight, and then quickly and exactly dried. The dried fabric is treated with a suitable diazotizing bath. A suitable diazotizing bath may be prepared by mixing together 25 to 30 cc of hydrochloric acid of 19-20° Bé., 50 cc of alcohol and 35 cc of 35 per cent formalin solution. With this particular diazotizing bath the impregnated fabric should be submerged therein for about 20 to 30 seconds. The treated fabric is removed from the diazotizing bath, wrung out and then submerged in a 1 per cent soda solution for about 2 minutes. It may be subsequently boiled in a soap solution for about 15 minutes, and then rinsed with water. After rinsing with water the dyed fabric may be revivified by treating with slightly acidified water, containing about 2 per cent acetic acid. After revivification the fabric is rinsed and dried. The fabric is dyed in a scarlet red shade.

The above process may be used with other intermediate compounds of the generic class set forth. The following table gives certain typical intermediates with the colors produced:

Benzidine-mono-salicylid_____Yellow
Dianisidin-mono-hydroxynaphthosid _Heliotrope
Meta-amino-ortho-toluidid of beta
　hydroxynaphthoic acid_____ Rose red
Meta-amino-ortho-anisidid of
　beta-hydroxynaphthoic acid____ Bordeaux red
Para-aminoanilide of beta-
　hydroxynaphthoic acid_____ Red violet
Para-amino-ortho-anisidid of beta-
　hydroxynaphthoic acid_____ Violet
Para-amino-cresol methyl ether-
　anilid of 2:3 beta hydroxy-
　naphthoic acid_____ Dark blue
　(approximately equal to Chicago blue R₄)

*Example 12.*—An impregnated bath may be prepared as follows: 2 grams of meta-aminoanilide of 2:3 beta hydroxynaphthoic acid is mixed with 7.5 grams of Turkey red oil until an intimate mixture is obtained. The mixture is dissolved in 200 cc of hot water at 80 to 90° C., and about 30 cc of caustic soda solution of 40° B. This solution is diluted with cold water to about 1 liter. The fabric is dipped in the above impregnating bath until it is sufficiently impregnated and then removed. The moist impregnated fabric is directly introduced into a suitable diazotizing and developing bath. Such a suitable bath may be prepared by mixing together 20 cc of glacial acetic acid, 20 grams of solid nitrite, 50 cc of 33 per cent formalin and sufficient water to make about a liter of solution. The impregnated fabric may be submerged for about 15 to 20 minutes in said impregnating bath and then removed and rinsed with water. During such treatment the dyestuff is produced by simultaneous diazotization and coupling to produce the dyed fabric. After rinsing with water the dyed product may be then washed with weak soda or soap solution. When soap solution is used the dyed fabric may be revivified or quickened with slightly acidulated water as disclosed in Example 11. This treatment gives a somewhat better shade to the dyed fabric.

In the above process, other of my new intermediates may be substituted for the particular meta-aminoanilide given above. However, when the amino group in such compounds is in the para position, the process should be slightly modified. With the amino group in the para position a longer time is required to complete the coupling. The coupling may be facilitated by treating the fabric, after removing it from the diazotizing bath and before washing, with dilute soda or ammonia solution. With di-anisidine-mono-naphthosid, heliotrope colors are obtained, but such colors require a rather long treatment with the weak soda or ammonia solution to properly develop them. This modification should be used in certain cases, for otherwise a subsequent treatment with soap solution may have an undesirable effect upon the dyed material. With fabric dyed with dianisidine amino hydroxynaphthosid, if the treatment with soda or ammonia solution is not sufficient, these dyed fabrics when soaped develop brown shades. It seems that these brown shades are caused by brown products formed by acid coupling.

*Example 13.*—The fabrics impregnated by the process of Example 12, may be developed with diazotizing baths somewhat different from that given in Example 12. For instance they may be treated with a diazotizing bath made as follows: Dissolve 20 grams of nitrite in 1 liter of water at 0° C. and add to the solution thus obtained 20 cc of hydrochloric acid of 20° B. and 50 cc of commercial formalin solution; then add sufficient sodium acetate until the solution has a neutral reaction to Congo red indicator. This diazotizing bath behaves like a pure nitrous acid solution. The impregnated fabric is submerged in such diazotizing bath for a suitable length of time to produce the dyed fabric and then removed. The dyed fabric may be further processed as disclosed in either Example 11 or 12.

*Example 14.*—An impregnating bath may be prepared as follows:—5 grams of meta-aminoanilide of 2:3 beta-hydroxynapthoic acid are mixed with 2 grams of Turkey red oil and the mixture added to about 200 cc of hot water containing 3 cc of 30° B. soda lye. The solution is heated until clarified. 1 gram of ammonium chlorid is added and the solution heated for several minutes to boiling. It is then diluted with cold water containing about 50 cc of methyl alcohol per liter.

Woolen fabric is soaked in the above impregnating solution for about a half hour. During this time the fabric may be removed, lightly wrung out and returned to the bath; thus insuring a thorough impregnation of the material. After the impregnation is sufficient, the fabric is removed and lightly wrung out, and then wound on suitable apparatus to facilitate the mechanical handling of the material. The impregnated fabric is then ready to be treated with the diazotizing bath. A suitable diazotizing bath comprises an aqueous solution containing 5 grams of sodium nitrite, 5 cc of glacial acetic acid and 20 cc of methyl alcohol per liter. The impregnated fabric is submerged in the above diazotizing bath. About 45 to 60 minutes is usually sufficient for diazotization and self-coupling. The dyed woolen fabric is removed from the diazotizing bath and unwound. It is then carefully rinsed and may be worked in neutral or weakly alkaline soap solution and finally rinsed with water and dried.

What I claim is:

1. In the manufacture of dyed fabrics containing animal, vegetable or artificial fibers, the process which comprises impregnating such fabric with a solution of an amino compound of the anilide type having the probable formula:

$$HO-R_1-C-N-R_2-NH_2$$
$$\phantom{HO-R_1-}\underset{O}{\|}\phantom{-}\underset{H}{|}$$

wherein $R_1$ represents an aryl residue of the class consisting of benzene and naphthalene nuclei, or the residue of the enol component of a ketocarboxylic acid and $R_2$ represents an aryl residue of the class consisting of benzene and diphenyl nuclei, treating the so impregnated fabric with a diazotizing solution to diazotize and self-couple the said intermediate and form in situ the azo dyestuff thereby producing directly the dyed fabric.

2. In the manufacture of dyed fabrics containing animal, vegetable or artificial fibers, the process which comprises impregnating such fabric with a solution of an amino compound of the anilide type having the probable formula:

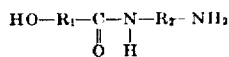

wherein $R_2$ represents an aryl residue of the class consisting of benzene and diphenyl nuclei, treating the so-impregnated fabric with a diazotizing solution to diazotize and self-couple the said intermediate and form in situ the azo dyestuff thereby producing directly the dyed fabric.

3. In the manufacture of dyed fabrics containing animal, vegetable or artificial fibers, the process which comprises impregnating such fabric with a solution of an amino compound of the anilide type having the probable formula:

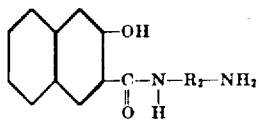

wherein $R_2$ represents an aryl residue of the class consisting of benzene and diphenyl nuclei, treating the so impregnated fabric with a diazotizing solution to diazotize and self-couple the said intermediate and form in situ the azo dyestuff thereby producing directly the dyed fabric.

4. In the manufacture of dyed fabrics containing animal, vegetable or artificial fibers, the process which comprises impregnating such fabric with a solution of an amino compound of the anilide type having the probable formula:

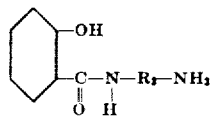

wherein $R_2$ represents an aryl residue of the class consisting of benzene and diphenyl nuclei and $R_4$ represents hydrogen or an alkyl group, treating the so impregnated fabric with a diazotizing solution to diazotize and self-couple the said intermediate and form in situ the azo dyestuff, thereby producing directly the dyed fabric.

5. In the manufacture of dyed fabrics containing animal, vegetable or artificial fibers, the process which comprises impregnating such fabric with a solution of an amino compound of the anilide type having the probable formula:

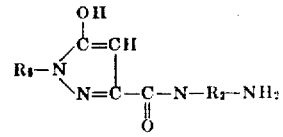

wherein $R_2$ represents an aryl residue of the class consisting of benzene and diphenyl nuclei, $R_6$ represents aryl or alkyl group, treating the so impregnated fabric with a diazotizing solution to diazotize and self-couple the said intermediate and form in situ the azo dyestuff, thereby producing directly the dyed fabric.

6. In the manufacture of dyed fabrics containing animal, vegetable or artificial fibers, the process which comprises impregnating such fabric with a solution of an amino compound of the anilide type having the probable formula:

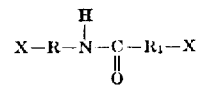

wherein $R_1$ represents an aryl of the class consisting of benzene and naphthalene nuclei, residue or the residue of the enol form of a ketocarboxyl acid, R represents an aryl residue of the class consisting of benzene and diphenyl nuclei, and X represents OH or $NH_2$ groups, and in which at least one X is $NH_2$, treating the so impregnated fabric with a diazotizing solution to diazotize and self-couple the said intermediate and form in situ the azo dyestuff thereby producing directly the dyed fabric.

7. In the manufacture of dyed fabrics containing animal, vegetable or artificial fibers, the process which comprises impregnating such fabric with a solution of an amino compound of the anilide type having the probable formula:

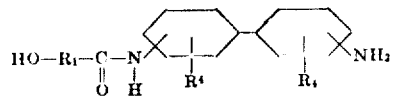

wherein $R_1$ represents an aryl of the class consisting of benzene and naphthalene nuclei, residue or the residue of the enol form of a ketocarboxyl acid, and $R_4$ represents hydrogen or an alkyl group, treating the so impregnated fabric with a diazotizing solution to diazotize and self-couple the said intermediate and form in situ the azo dyestuff, thereby producing directly the dyed fabric.

8. In the manufacture of dyed fabrics containing animal, vegetable or artificial fibers, the process which comprises impregnating such fabric with a solution of an amino compound of the anilide type having the probable formula:

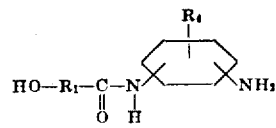

wherein $R_1$ represents an aryl group of the class consisting of benzene and naphthalene nuclei or the residue of the enol form of a ketocarboxylic acid, and $R_4$ represents hydrogen or an alkyl group, treating the so impregnated fabric with a diazotizing solution to diazotize and self-couple the said intermediate and form in situ the azo dyestuff, thereby producing directly the dyed fabric.

9. In the manufacture of dyed fabrics containing animal, vegetable or artificial fibers, the process which comprises impregnating such fabric with a solution of an amino compound of the anilide type having the probable formula:

wherein $R_1$ represents a benzene or naphthalene residue, $R_2$ represents an aryl residue of the class consisting of benzene and diphenyl nuclei, and X represents a OH or $NH_2$ group, treating the so impregnated fabric with a diazotizing solution to diazotize and self-couple the said intermediate and form in situ the azo dyestuff, thereby producing directly the dyed fabric.

10. In the manufacture of dyed fabrics containing animal, vegetable or artificial fibers, the process which involves the step of impregnating such fabric with a solution of an amino compound of the anilide type having the probable formula:

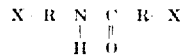

wherein R represents an aryl residue of the class consisting of benzene, naphthalene and diphenyl nuclei and X represents OH, or $NH_2$ groups and in which at least one X is $NH_2$.

11. In the manufacture of dyed fabrics containing animal, vegetable or artificial fibers, the process which involves the step of impregnating such fabric with a solution of an amino compound of the anilide type having the probable formula:

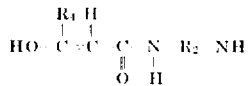

wherein $R_2$ represents an aryl residue of the class consisting of benzene and diphenyl nuclei, $R_4$ represents hydrogen or an alkyl group.

12. In the manufacture of dyed fabrics containing animal, vegetable or artificial fibers, the process which involves the step of impregnating such fabric with a solution of an amino compound of the anilide type having the probable formula:

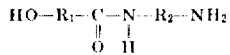

wherein $R_1$ represents an aryl residue of the class consisting of benzene and naphthalene nuclei, or the residue of the enol form of a ketocarboxylic acid, and $R_2$ represents an aryl residue of the class consisting of benzene and diphenyl nuclei.

13. In the manufacture of dyed fabrics containing animal, vegetable or artificial fibers, the process which involves the step of impregnating such fabric with a solution of an amino compound of the anilide type having the probable formula:

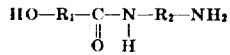

wherein $R_1$ represents a benezene or naphthalene residue and $R_2$ represents an aryl residue of the class consisting of benzene and diphenyl nuclei.

14. In the manufacture of dyed fabric containing animal, vegetable or artificial fibers, the process which comprises impregnating such fabric with an aqueous solution of a soluble salt of the amino compound of the anilide type, said amino compound in the free state having the probable formula:

wherein $R_1$ represents a benzene or naphthalene residue, and $R_2$ represents an aryl residue of the class consisting of benzene and diphenyl nuclei, treating the so-impregnated fabric with a diazotizing solution to diazotize and self-couple said intermediate and form in situ an azo dyestuff and thereby producing directly the dyed fabric.

15. The process of claim 14 wherein said salt of said amino compound is decomposed to regenerate in situ the said amino compound prior to treating with the said diazotizing solution.

16. In the manufacture of dyed fabric containing animal, vegetable or artificial fibers, the process which comprises impregnating such fabric with an aqueous alkaline solution of an amino compound of the anilide type, said amino compound in the free state having the probable formula:

wherein $R_1$ represents a benzene or naphthalene residue, and $R_2$ represents an aryl residue of the class consisting of benzene and diphenyl nuclei, treating the so-impregnated fabric with a dilute acid solution to form in situ the said amino compound in the free state, and then applying to the so-treated fabric a diazotizing solution to diazotize and self-couple said intermediate and form insitu an azo dyestuff and thereby producing directly the dyed fabric.

17. In the manufacture of dyed fabric containing animal, vegetable or artificial fibers, the process which comprises impregnating such fabric with an aqueous solution comprising an amino compound of the anilide type, caustic soda, sodium nitrite and water, said amino compound having the probable formula:

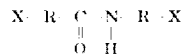

wherein R represents an aryl residue of the class consisting of benzene, naphthalene and diphenyl nuclei or the residue of the enol form of a ketocarboxylic acid, and X represents OH or $NH_2$ groups and in which at least one X is $NH_2$ and at least one R is such an aryl residue, treating the so impregnated fabric with a diazotizing solution to diazotize and self-couple said intermediate and form in situ the azo compound and thereby producing directly the dyed fabric.

18. In the manufacture of dyed fabric containing animal, vegetable or artificial fibers, the process which comprises impregnating such fabric with an aqueous solution comprising an amino compound of the anilide type, caustic soda and water, said amino compound having the probable formula:

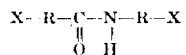

wherein R represents an aryl residue of the class consisting of benzene, naphthalene and diphenyl nuclei or the residue of the enol form of a ketocarboxylic acid, and X represents OH or $NH_2$ groups and in which at least one X is $NH_2$ and at least one R is such an aryl residue, treating the so impregnated fabric with a diazotizing solution to diazotize and self-couple said intermediate and form in situ the azo compound and thereby producing directly the dyed fabric.

19. In the manufacture of dyed fabric containing animal, vegetable or artificial fibers, the process which comprises impregnating such fabric with an aqueous solution comprising an amino compound of the anilide type, caustic soda, Turkey red oil and water, said amino compound having the probable formula:

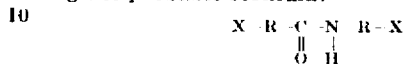

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue, treating the so impregnated fabric with a diazotizing solution to diazotize and self-couple said intermediate and form in situ the azo compound and thereby producing directly the dyed fabric.

20. In the manufacture of dyed fabric containing animal, vegetable or artificial fibers, the process which comprises impregnating such fabric with an aqueous solution comprising an amino compound of the anilide type, caustic soda, an alcohol and water, said amino compound having the probable formula:

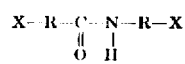

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue, treating the so impregnated fabric with a diazotizing solution to diazotize and self-couple said intermediate and form in situ the azo compound and thereby producing directly the dyed fabric.

21. In the manufacture of dyed fabric containing animal, vegetable or artificial fibers, the process which comprises impregnating such fabric with an aqueous solution comprising an amino compound of the anilide type, caustic soda, ammonium chloride and water, said amino compound having the probable formula:

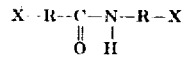

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue, treating the so impregnated fabric with a diazotizing solution to diazotize and self-couple said intermediate and form in situ the azo compound and thereby producing directly the dyed fabric.

22. In the manufacture of dyed fabric containing animal, vegetable or artificial fibers, the process which comprises impregnating such fabric with an aqueous solution of the hydrochlorid type salt of an amino compound, said amino compound being of the anilide type and having the probable formula:

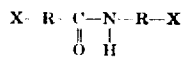

wherein R represents an aryl residue of the class consisting of benzene, naphthalene and diphenyl nuclei or the residue of the enol form of the ketocarboxylic acid and X represents OH or NH₂ groups and in which at least one X is NH₂ and at least one R is such an aryl residue, treating the so impregnated fabric with a diazotizing solution to diazotize and self-couple said intermediate and form in situ an azo dyestuff and thereby producing directly the dyed fabric.

23. The process of claim 22 wherein the impregnated fabric before being treated with the diazotizing solution is treated with a dilute alkaline solution to decompose said salt of the hydrochlorid type and form in situ in the fabric said amino compound.

24. In the manufacture of dyed fabric containing animal, vegetable or artificial fibers, the process which comprises impregnating such fabric with an aqueous solution comprising an amino compound of the anilide type having the probable formula:

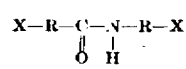

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue, treating the so impregnated fabric with a diazotizing solution comprising an acid, sodium nitrite, an alcohol and water to diazotize and self-couple said intermediate and form in situ an azo compound and thereby producing directly the dyed fabric.

25. In the manufacture of dyed fabric containing animal, vegetable or artificial fibers, the process which comprises impregnating such fabric with an aqueous solution comprising an amino compound of the anilide type having the probable formula:

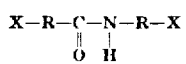

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue and water, treating the so impregnated fabric with a diazotizing solution comprising an acid, sodium nitrite, formaldehyde and water to diazotize and self-couple said intermediate and form in situ an azo compound and thereby producing directly the dyed fabric.

26. In the manufacture of dyed fabric containing animal, vegetable or artificial fibers, the process which comprises impregnating such fabric with an aqueous solution comprising an amino compound of the anilide type having the probable formula:

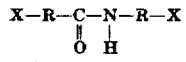

wherein R represents an aryl residue of the class consisting of benzene, naphthalene and diphenyl nuclei or the residue of the enol form of a ketocarboxylic acid, and X represents OH or NH₂ groups and in which at least one X is NH₂ and at least one R is such an aryl residue, and treating the so impregnated fabric with a diazotizing solution comprising an acid, sodium nitrite, sodium acetate and water to diazotize and self-couple said intermediate and form in situ the azo compound and thereby producing directly the dyed fabric, the amount of sodium acetate being sufficient to render the diazotizing solution neutral to Congo red indicator.

27. In the manufacture of dyed fabric containing animal, vegetable or artificial fibers, the process which comprises impregnating such fabric with a aqueous solution comprising an amino compound of the anilide type, caustic soda, sodium nitrite and water, said amino compound having the probable formula:

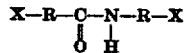

wherein R represents an aryl residue of the class consisting of benzene, naphthalene and diphenyl nuclei or a residue of the enol form of a ketocarboxylic acid and X represents OH or $NH_2$ groups and in which at least one X is $NH_2$ and at least one R is such an aryl residue, treating the so impregnated fabric with a diazotizing solution comprising hydrochloric acid, alcohol, formaldehyde and water to diazotize and self-couple said intermediate to form in situ the azo dyestuff and thereby produce directly the dyed fabric.

JOSEPH FELIX TURSKI.

CERTIFICATE OF CORRECTION.

Patent No. 1,922,463.      August 15, 1933.

JOSEPH FELIX TURSKI.

It is hereby certified that error appears in the printed specification of the above numbered patent requiring correction as follows: Page 1, line 14, strike out the article "a" first occurrence; page 6, lines 104 and 105, and 125 and 126, claims 6 and 7, respectively, strike out the word "residue" and insert the same after "aryl" in lines 103 and 124, of said claims; and that the said Letters Patent should be read with these corrections therein that the same may conform to the record of the case in the Patent Office.

Signed and sealed this 14th day of November, A. D. 1933.

F. M. Hopkins (Seal)      Acting Commissioner of Patents.

dyed fabric, the amount of sodium acetate being sufficient to render the diazotizing solution neutral to Congo red indicator.

27. In the manufacture of dyed fabric containing animal, vegetable or artificial fibers, the process which comprises impregnating such fabric with a aqueous solution comprising an amino compound of the anilide type, caustic soda, sodium nitrite and water, said amino compound having the probable formula:

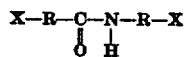

wherein R represents an aryl residue of the class consisting of benzene, naphthalene and diphenyl nuclei or a residue of the enol form of a ketocarboxylic acid and X represents OH or $NH_2$ groups and in which at least one X is $NH_2$ and at least one R is such an aryl residue, treating the so impregnated fabric with a diazotizing solution comprising hydrochloric acid, alcohol, formaldehyde and water to diazotize and self-couple said intermediate to form in situ the azo dyestuff and thereby produce directly the dyed fabric.

JOSEPH FELIX TURSKI.

CERTIFICATE OF CORRECTION.

Patent No. 1,922,463.　　　　　　　　　　　　　　　　　　　　August 15, 1933.

JOSEPH FELIX TURSKI.

It is hereby certified that error appears in the printed specification of the above numbered patent requiring correction as follows: Page 1, line 14, strike out the article "a" first occurrence; page 6, lines 104 and 105, and 125 and 126, claims 6 and 7, respectively, strike out the word "residue" and insert the same after "aryl" in lines 103 and 124, of said claims; and that the said Letters Patent should be read with these corrections therein that the same may conform to the record of the case in the Patent Office.

Signed and sealed this 14th day of November, A. D. 1933.

F. M. Hopkins (Seal)　　　　　　　　　　　　　　　　　　　　　Acting Commissioner of Patents.

CERTIFICATE OF CORRECTION.

Patent No. 1,922,463.　　　　　　　　　　　　　　　　　　August 15, 1933.

JOSEPH FELIX TURSKI.

It is hereby certified that error appears in the printed specification of the above numbered patent requiring correction as follows: Page 1, line 14, strike out the article "a" first occurrence; page 6, lines 104 and 105, and 125 and 126, claims 6 and 7, respectively, strike out the word "residue" and insert the same after "aryl" in lines 103 and 124, of said claims; and that the said Letters Patent should be read with these corrections therein that the same may conform to the record of the case in the Patent Office.

Signed and sealed this 14th day of November, A. D. 1933.

F. M. Hopkins (Seal)　　　　　　　　　　　　　　　　　　　　　Acting Commissioner of Patents.